United States Patent Office

3,558,337
Patented Jan. 26, 1971

3,558,337
FINE PARTICLES
William Richard Barnes, "Wintrena," York Drive, Grappenhall, Cheshire, England, and Donald Barby, Arlington, Manor Park, Great Barrow, Chester, Cheshire, England
Filed Dec. 7, 1967, Ser. No. 688,777
Claims priority, application Great Britain, Dec. 8, 1966, 55,110/66
Int. Cl. C09c 1/28
U.S. Cl. 106—288                                       6 Claims

ABSTRACT OF THE DISCLOSURE

A process for the production of activated submicron silica in which silica is vaporised in a plasma generator and subjected to a controlled quench in the presence of a hydrogen containing compound to produce thixotropically or hydrophobically activated silica.

---

Figure 1:
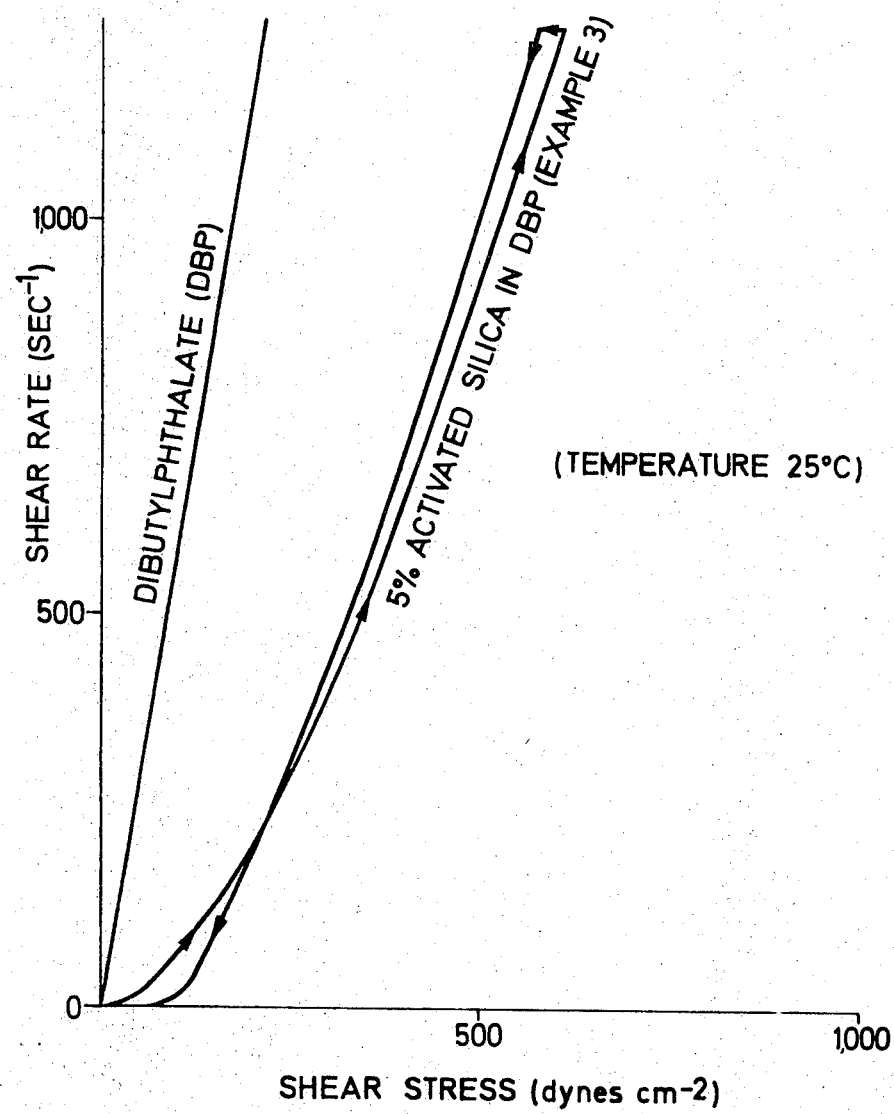

The present invention relates to the production of finely divided inorganic materials, particularly to inorganic materials of submicron size and more especially to submicron silica.

It has been known for some time that various inorganic materials in very finely divided form have properties different from those of the same materials in their more readily available particle sizes but hitherto methods of producing such inorganic materials in very fine particles sizes have been rather expensive and the high price of the resulting products has restricted their use.

When reference is made in this specification to submicron inorganic materials reference is intended to silica powders in which the large majority of particles are smaller than 500 millimicrons. In such powders larger particles may be present but in general there should be fewer than 2% of particles exceeding 500 millimicrons. These particles form powders having a bulk density between 20 and 500 grams per litre.

Hitherto submicron silicas have been produced either by precipitation, grinding or otherwise disintegrating larger particulate material or alternatively by burning various compounds containing silicon to provide a vapour which yields fine particles of silica. It has now been found that the exceedingly high temperatures which can be produced in various forms of plasma equipment can be used to convert the inorganic materials to vapour and so produce, under carefully selected quench conditions, very fine inorganic powders, the submicron inorganic materials of the type hereinbefore defined. With care in the design of the apparatus and the recovery of heat retained in the plasma efflux the present invention can provide a cheap source of submicron materials.

The control of the quench conditions, that is to say the speed at which the vapour is converted and cooled and the selection of the atmosphere in which this conversion takes place, have a significant effect on the surface chemistry and structure of the submicron particles formed and hence on their properties and the products of the present invention are activated submicron silicas, the activation of which will become apparent hereinafter.

Accordingly the present invention provides a process for the manufacture of submicron silica particles in which process a silica feed is vaporised in a plasma generator and the tail flame from the plasma generator, containing the vaporised silica, is subjected to a controlled quench in the presence of a hydrogen containing compound to produce activated submicron silica particles.

The technique of introducing the hydrogen containing compound into the plasma generator is critical in its effect in activation of the submicron silica particles. When the activation of the submicron silica particles is to be in respect of thixotropic properties the hydrogen containing compound must be introduced into the plasma system at a position arranged to ensure that free hydrogen is present during the formation of the solid submicron silica particles. The presence of free hydrogen at this stage can be arranged by introducing the hydrogen containing compound with the feed of silica particles to the plasma generator hence allowing the compound to pass through the hottest portions of the generator or alternatively hydrogen containing compounds may be introduced with a quench fluid providing the quench is added at a temperature sufficiently high to ensure the production, from the hydrogen containing compound, of free hydrogen.

The hydrogen may be derived from any compound which, in the high temperature conditions existing in the plasma generator will dissociate to release free hydrogen. Suitable compounds for this purpose include water; ammonia; mono-, di- and polybasic alcohols, hydrocarbons and materials such as kaolinite which themselves contain, and hence can introduce, significant quantities of water into the system. Alternatively, suitable quantities of hydrogen gas may be introduced into the system either as part of the plasma forming gas or as part of the quench gas.

If the activation of the submicron silica is intended to yield a product having hydrophobic properties than the hydrogen yielding compound should be a polar with a hydrophobic group and it should be introduced into the tail flame of the plasma generator at a point at which solidification of the submicron particles has commenced and at which the temperature of the plasma is not high enough to decompose all the compound to produce free hydrogen atoms.

Suitable organic compounds for this purpose include alkylhalosilanes, such as dimethyldichlorosilane, organic alcohols, preferably long straight chain alcohols, such as n-decanol, amines or organic acids.

The preferred compounds are the straight chain alcohols and chlorosilanes.

Plasma generators suitable for use in the present invention are the subject of United States applications Ser. Nos. 463,799 and 594,598 and others are disclosed in U.S. Pat. 2,922,869 and U.S. Reissue No. 25,088. In addition radio frequency (RF) plasma generators may be used and these, in that they do not require the use of electrodes, can be advantageously employed when products of extremely high purity are required.

Fine silica can be introduced into the plasma generator by various means depending on the form of the generator in use. The essential requirement is that the silica is vaporised in the generator and then rapidly, and as uniformly as possible, quenched. When an RF generator is employed the silica is conveniently passed down the whole length of a vertically mounted plasma generator and can be fed into the top of the generator using a vibrator feeder or entrained in a plasma forming or carrier gas.

When a direct current (DC) or low frequency alternating current (AC) plasma generator is employed having electrodes the fine silica may be introduced through one or other of the electrodes or into a zone in the tail flame sufficiently hot to vaporise the silica. Again the silica may be fed to the generator using a vibrator and/or entrained in a gas feed.

The controlled quench is achieved by feeding into the tail flame of the generator carrying the vaporised silica a sufficient quantity of quench gas to ensure rapid and uniform cooling of the silica to produce the submicron particles. Care must be taken to ensure that no undue back pressure is induced into the generator and conveniently the quench is provided by directing a number of jets of quench gas from an annular manifold, extending round the path of the tail flame, into the tail flame in its direction of flow and at an angle of about 45° to the axis of the plasma tail flame.

The RF plasma generator (generator I) used in some of the following examples consists essentially of a water-cooled (200 gallons per hour) quartz tube around which extend five turns of a heavy copper wire which is directly coupled to an RF generator operating at 4 megacycles per second. At the top of the plasma tube are provided there separate gas entry ports and the feed port for the sand. A vaporising unit is attached to one of the plasma gas feed ports to permit the introduction of vapours of selected liquids in the plasma feed gas to promote the activation of the silica product. The vaporising unit consists essentially of a spiral wound heating wire onto which the liquid to be vaporised can be dropped and hence vaporised and fed into the plasma gas feed line.

At the bottom of the plasma tube there is provided a quench unit comprising an annular plenum chamber or manifold provided with some one hundred holes of 0.4 mm. diameter arranged to direct jets of quench gas into the tail flame of the plasma in the direction of flow and at an angle of about 45° with the axis of the plasma flame. The quench gas and tail flame are then passed together into a large quench chamber and the submicron silica is collected therein and in a fine mesh bag of woven fibreglass mounted on an outlet from the quench chamber.

In operation after the plasma has been formed sand is passed into the unit at a rate of 250 grams per hour with the carrier gas flow of 4 s.c.f.h. (standard cubic feet per hour) of argon. The stabiliser gas is fed into the ports at the top of the plasma tube and is made up of oxygen and argon at 25 s.c.f.h. and 20 s.c.f.h. respectively.

A direct current plasma generator (generator II) used in some of the following examples consists essentially of a tungsten button anode separated from a cylindrical cathode by a cylindrical gas chamber provided with a series of gas feed ports arranged tangentially around the periphery of the gas chamber. The cylindrical cathode is connected, by a narrow or wasted portion which constitutes a feed chamber and which is also provided with tangential inlet ports to a cathode extension tube.

At the end of the cathode extension tube is provided a quench unit of the same form as that described in connection with the RF generator I.

Generator II is powered by a transformer/rectifier unit. Plasma forming gas consisting of a mixture of nitrogen and argon is fed to the gas chamber and the operation of the generator commenced. Silica is supplied to the feed chamber entrained in nitrogen and is rapidly vaporised in the plasma tail flame and the tail flame containing the vaporised silica is quenched by a gas fed in through the quench unit.

The hydrogen containing compound can be introduced into generator II with the plasma forming gas, with the silica and its entraining gas or with the quench gas and in each case the vaporising unit described in connection with generator II can be employed.

Various tests were applied to the submicron silicas produced from these RF plasma apparatus and the terms involved in the eveluation of these submicron silicas are defined as follows:

(1) Surface area.—Unless otherwise specified the surface area is defined by the standard BET determination of surface area with respect to nitrogen.

(2) Bulk density.—This is determined by the standard free fall method. The material falls from the tared beaker through a filter funnel into a measuring cylinder and the final volume is measured and the bulk density calculated.

(3) Comb viscosity test.—This test consists of applying a thick film of 0.01 to 0.020 inch of a polyester resin (Beck Koller resin 55 was used) into which a sample of silica (3% by weight on resin) has been mixed onto a plate of glass. The comb is then drawn across the surface of the film producing bands of different separations. The plate is held vertically and the changes which take place in the comb marks are observed. If the comb marks run, that is to say disappear, then the dispersion has failed the test—a pass is obtained if, after standing for one hour, no change in the comb marks is observed.

(4) Thixotropic index.—In this test a consistency curve is drawn on the basis of the following experiments. About 25 ml. of a dispersion of 3% by weight of silica in a polyester resin (Beck Koller resin 55) having Newtonian flow and a viscosity of 7.4 poise at 25° C.) is transferred to the cup of a viscometer and allowed to come to thermal equilibrium at 25° C. The shear rate is then increased and decreased linearly with time and the stress reading recorded for 10 minutes (the time interval between each stress reading is one minute). If these two curves do not coincide but cross over a thixotropic hysteresis loop is present and the blend under investigation is thixotropic. Both the area of this loop and the ratio of the viscosity at 5.4 sec.$^{-1}$: the viscosity at 54 sec.$^{-1}$ (the thixotropic index) have been used to assess the amount of thioxtropy imparted into the polyester blend. A sample with a thixotropic index below 1.8 is not considered to exhibit thixotropic properties.

The fine silica feed can be a silica flour or sand passing a 200 B.S.S. mesh sieve.

The thixotropically activated silicas produced by the process of this invention in which the hydrogen containing compound is subjected to very high temperatures have a chain like structure and can be used for thickening various compositions and details of some uses are illustrated in the following Examples 1 to 10.

Examples 11 to 14 illustrate another form of silica which can be produced when the hydrogen containing compound is included in a much lower temperature zone and a different activation of the silica results enhancing its hydrophobic properties and yielding in some cases a typical coated silica.

Using the RF plasma generator II the following series of experiments was carried out and the results are summarised in Table 1. The power supply to the generator was 24 kilowatts.

EXPERIMENT A

With the vaporising unit disconnected and using air as the quench gas (plenum pressure 15 pounds per square inch (p.s.i.) dry silica was passed through the plasma generator as described above and the product was a submicron silica having a surface area of about 260 m.$^2$/g.

EXAMPLE 1

Using the vaporising unit to introduce ethanol into the plasma gas more silica was made. Industrial ethyl alcohol was vaporised in the vaporising unit and 3% by weight on the sand feed was fed into the same plasma gas mixture and an activated submicron silica produced.

EXAMPLE 2

With the vaporising unit disconnected but bubbling the plasma gas feed through water a further quantity of silica was treated in the generator. The water carried into the generator by the plasma gas was about 2% by weight on the feed sand and an activated submicron silica produced.

EXAMPLE 3

Using the vaporising unit as a steam source 3% by weight of water calculated on the sand was introduced into the plasma gas feed and further activated submicron silica produced. The thixotropic nature of this silica is illustrated in FIG. 1 of the accompanying drawings in dibutyl phthalate.

EXPERIMENT B AND EXAMPLES 4 AND 5

With the vaporising unit disconnected and using dry air followed by two runs using air saturated with water vapour as the quench gas further samples of submicron silica were prepared and the thixotropic index of each sample measured in the polyester resin.

TABLE 1.—PROPERTIES OF SOME ACTIVATED SILICAS

| | S.A., m.$^2$/g. | Bulk density, g./cm.$^3$ | Plastic viscosity, 25° C. poise | Thixotropic Index | |
|---|---|---|---|---|---|
| Dibutyl phthalate | | | 1.75 | 1.0 | |
| Experiment A | 260 | 0.062 | 3.20 | 1.6 | |
| Example 1 | 398 | 0.048 | 4.83 | 5.3 | DBP. |
| Example 2 | 332 | 0.062 | 3.15 | 5.8 | |
| Example 3 | 415 | 0.050 | 4.60 | 5.8 | |
| Experiment B | 288 | 0.062 | | 1.0 | |
| Example 4 | 350 | 0.066 | 4.10 | 2.8 | Polyester. |
| Example 5 | 390 | 0.078 | 4.06 | 3.1 | |

EXAMPLE 6

This example illustrates the effect of introducing bound water with the feed sand on the physico-chemical structure of the activated silica produced.

Using the same operating conditions as in Example 1, a sample of activated silica was prepared from a feed sand containing 21.5% kaolin (3% bound water). Submicron particles were again produced and the fundamental particles appeared to join together to produce a chain-like structure. The surface properties of the material were:

Surface area 332 m.$^2$/g.$^{-1}$

Pore volume 0.69 ml./g.$^{-1}$

The bulk density was 0.065 g./cc.

Figure 2:
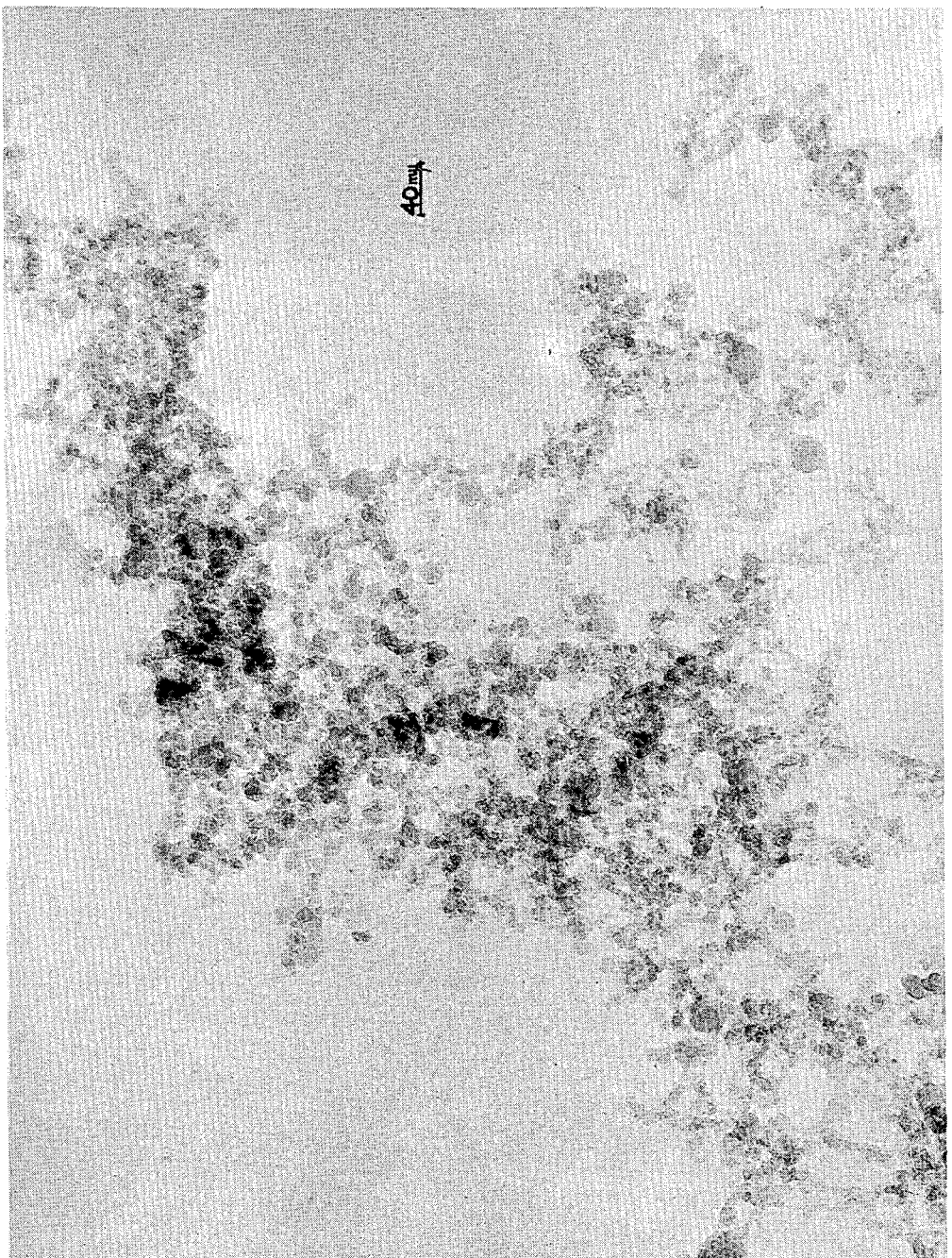

FIG. 2 is an electromicrograph at a magnification of 250,000 of the activated silica.

Using the DC generator II described above the following work was carried out.

EXAMPLE 7

Generator II was operated using damp, commercial grade, nitrogen as quench 380 (s.c.f.h.) and 15 (s.c.f.h.) nitrogen as plasma gas. The fine silica feed was at 450 g./hr. and the power was at 265 volts and 75 amps. Four runs were made, two with damp quench gas and two with 0.1% by weight of ammonia gas added to the wet quench gas. The results are set out as Example 7(a) and (b) and as (c) and (d) respectively.

| | Index (No NH$_3$) | Index 0.1% NH$_3$ |
|---|---|---|
| Example 7(a) | 3.6 | |
| Example 7(c) | | 4.6 |
| Example 7(b) | 3.0 | |
| Example 7(d) | | 3.7 |

EXAMPLE 8

A DC activated silica was made using generator II using wet nitrogen as plasma and quench gas. The product was separated as "ex filter bag" and "ex-chamber." The activated submicron silica was made up from some 23 runs on which the general data were:

Voltage drop—275±25 v.
Current—70±2 amps.
Plasma—140±20 s.c.f.h.
Quench flow (N$_2$)/wet up to 84 mg. water/g. of Na$_2$)— 340±30 s.c.f.h

| | Ex filter bag | Ex chamber |
|---|---|---|
| Bulk density, g./cm.$^3$ | 0.036 | 0.049 |
| Surface area, m.$^2$/g. | 255 | 248 |

They were white, free-flowing, readily-dispersible powders of about 20–30 m$\mu$ average particle size, by electron microscopy.

The viscosities at 5.4 sec.$^{-1}$ were 100 and 88 poise respectively for the filter-bag and chamber materials; the thixotropic index was 2.1 and 1.85 respectively in polyester. Both passed the comb viscosity test.

EXAMPLE 9

A DC activated silica of the type described in Example 8 was tested as a reinforcing filler for both natural rubber and synthetic butyl rubber. The formulations used were:

Standard natural rubber formulation

| | Phr. |
|---|---|
| Smoked sheet | 100 |
| Zinc oxide | 5 |
| Stearic acid | 3 |
| Vulcafor F | 3 |
| Silica | 42 |
| Sulphur | 3 |
| Nonox D | 1 |

Standard styrene/butadiene rubber (SBR) formulation

| | Phr. |
|---|---|
| Cariflex S1502 (SBR) | 100 |
| Zinc oxide | 5 |
| Stearic acid | 3 |
| Vulcafor F | 2.2 |
| Triethanolamine | 1 |
| Shell Talpa 30 oil | 5 |
| Silica | 60 |
| Sulphur | 2.5 |

Vulcafor F is di-2-benzothiazyl disulphide/diphenyl guanidine and Nonox D is phenyl $\beta$-naphthylamine.

In each case the cure temperature was 142° C. The test results were determined according to B.S. 903 and averaged.

A high quality silica used widely as a rubber reinforcing agent was tested for comparison. The results are given in Table 2.

The results indicate that activated silica "ex filter bag" has rubber reinforcing properties similar to a commercial material.

Compounding was slightly more difficult for this highly thixotropic activated silica than for less thixotropic commercial materials.

TABLE 2

| | Activated silica (chamber) | Activated silica (filter bag) | Comparable synthetic silica |
|---|---|---|---|
| (a) In standard natural rubber formulation 15 mins. cure time: | | | |
| Hardness, ° BS | 70 | 70 | 74 |
| Modulus at 300%, p.s.i | 450 | 600 | 490 |
| Tensile strength, p.s.i | 2,820 | 3,630 | 3,600 |
| Elongation at break, percent | 670 | 730 | 720 |
| Tear strength, p.s.i | 1,790 | 2,000 | 2,030 |
| (b) In standard natural rubber formulation 30 mins. cure time: | | | |
| Hardness, ° BS | 74 | 74 | 74 |
| Modulus at 300%, p.s.i | 450 | 500 | 490 |
| Tensile strength, p.s.i | 2,960 | 3,470 | 3,560 |
| Elongation at break, percent | 670 | 700 | 720 |
| Tear strength, p.s.i | 1,640 | 1,790 | 1,580 |
| (c) In standard S.B.R. formulation 15 mins. cure time: | | | |
| Hardness, ° BS | 83 | 85 | 88 |
| Modulus at 300%, p.s.i | 290 | 400 | 400 |
| Tensile strength, p.s.i | 1,950 | 2,400 | 2,410 |
| Elongation at break, percent | 800 | 780 | 820 |
| Tear strength, p.s.i | 1,110 | 720 | 1,170 |
| (d) In standard S.B.R. formulation 30 mins. cure time: | | | |
| Hardness, ° BS | 86 | 88 | 90 |
| Modulus at 300%, p.s.i | 550 | 530 | 620 |
| Tensile strength, p.s.i | 1,910 | 1,930 | 2,010 |
| Elongation at break, percent | 550 | 560 | 550 |
| Tear strength, p.s.i | 640 | 630 | 800 |

EXAMPLE 10

Thickening of dibutyl phthalate

Dibutyl phthalate can be used as a plasticiser and frequently needs to be made thixotropic. A commercial fume silica is used at 5% w./w. dispersion in industry for this purpose. Activated submicron silica made as described in Example 7 has been tested in this application.

Figure 5:
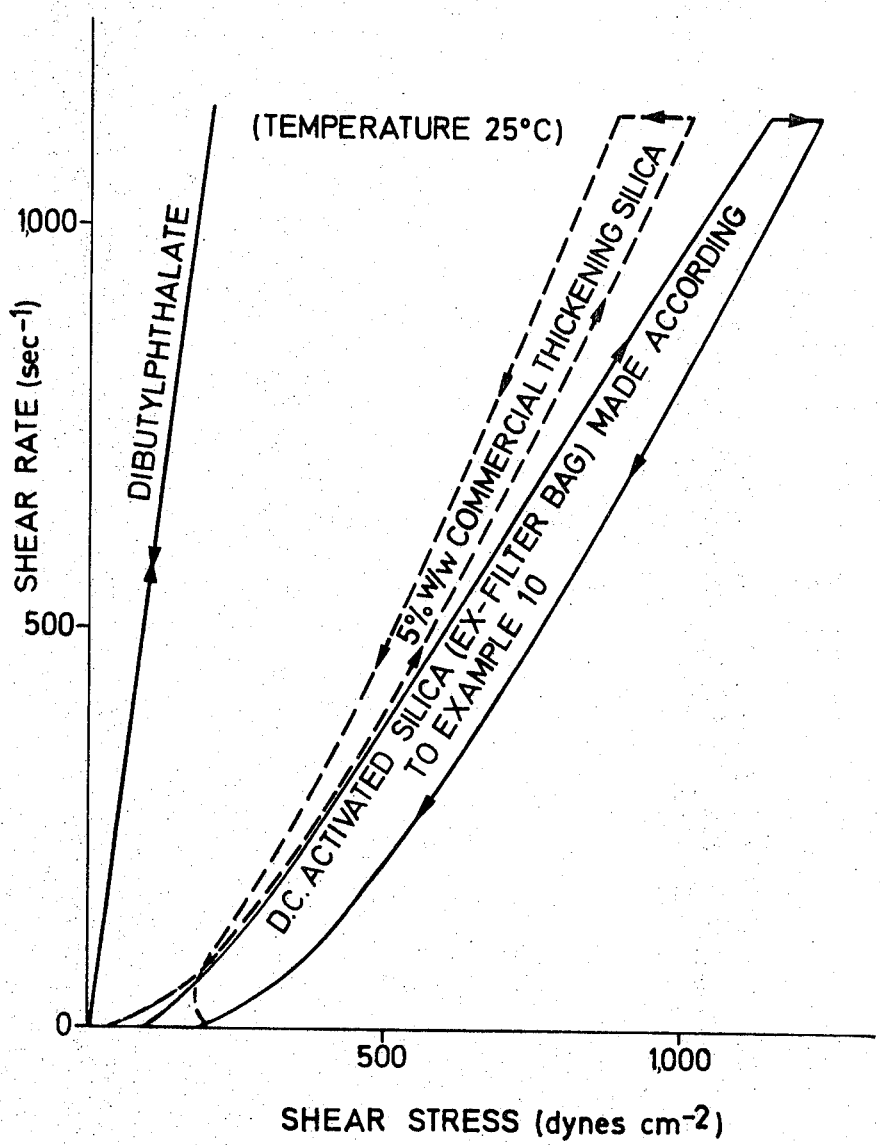

Results with 5% w./w. dispersion of activated silica ex-filter bag in dibutyl phthalate are shown as a rheological curve in FIG. 5. Dibutyl phthalate is included for comparison, and so is the most commonly used of the commercial silicas (a fume silica). It will be observed that the activated silica is better than the commercial silica. Results obtained with silica ex-chamber give about the same thixotropy as the commercial silica.

Figure 3:
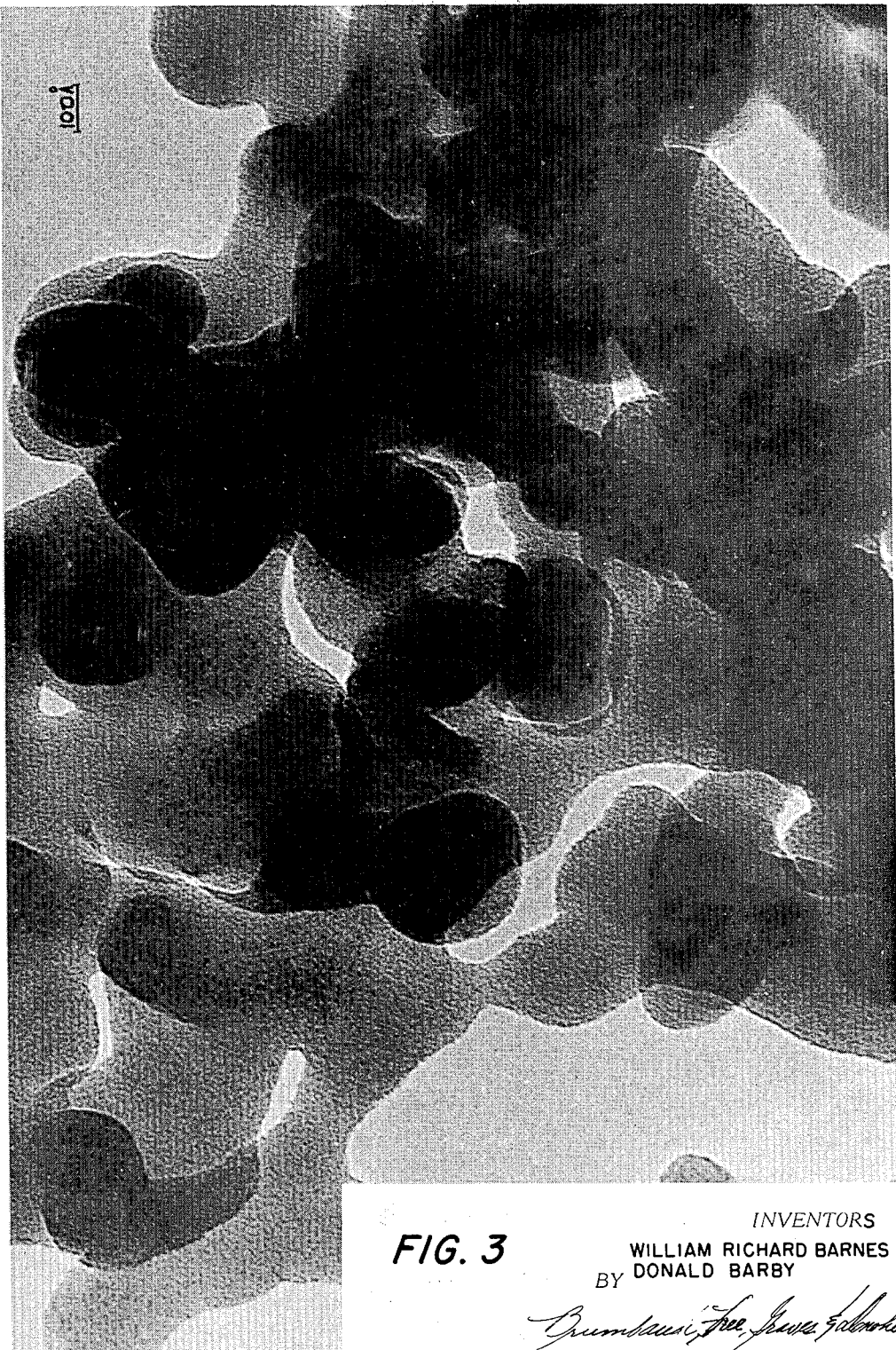
Figure 4:
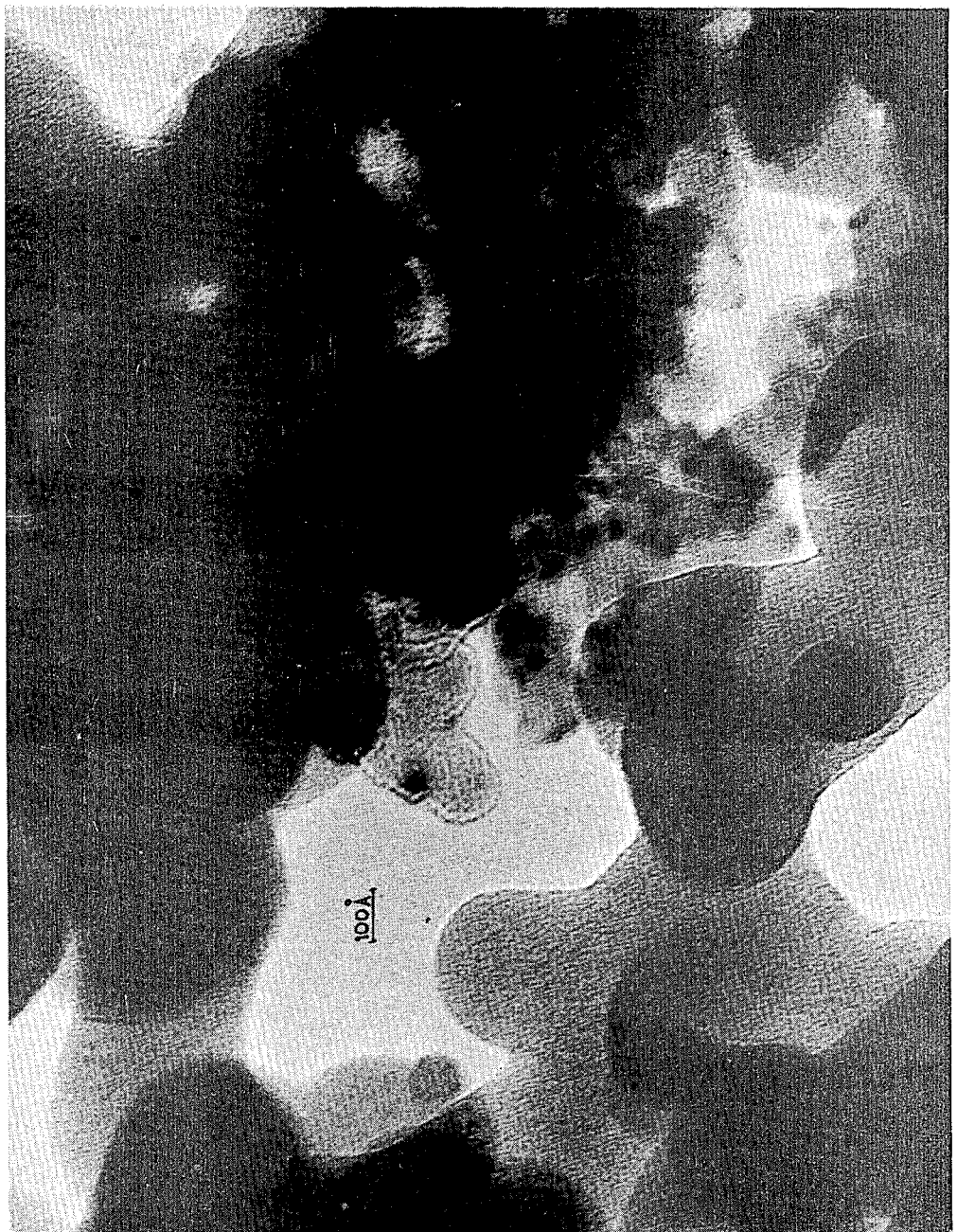

FIGS. 3 and 4 are electromicrographs of the commercial silica and activated silica respectively used in this example. Both figures are electromicrographs at a magnification of 1,000,000.

The production of submicron silica activated in respect of its hydrophobic properties can readily be achieved by introducing the hydrogen containing compound, preferably a long straight chain alcohol or an alkylhalosilane into the quench chamber of any of the plasma generators previously described.

The following Examples 11 to 14 illustrate this aspect of the invention.

EXAMPLE 11

Using the RF generator II with the quench unit powered at 24 kilowatts further quantities of activated submicron silica were prepared but in this example polar compounds containing a hydrophobic group were added to the submicron silica in the quench chamber.

When 3% by weight of n-butanol calculated on silica was added at 350° C. an activated submicron silica was produced which was hydrophobic but slowly hydrolysed.

EXAMPLE 12

Example 11 was repeated this time using n-decanol in place of the n-butanol. A hydrophobic submicron silica was produced.

EXAMPLE 13

Example 11 was repeated this time using titanium tetrachloride (3% by weight on silica) but added at 250° C. and followed by 3% by weight of methanol. A hydrophobic and organophilic submicron silica was produced.

EXAMPLE 14

Example 13 was repeated using silicon tetrachloride in place of the titanium tetrachloride and again using methanol. A hydrophobic organophilic submicron silica was produced.

What is claimed is:

1. A process for the manufacture of activated submicron silica particles which comprises feeding fine silica particles into a plasma generator; vaporizing the silica feed in the plasma generator to provide a tail flame containing vaporized silica; and subjecting the vaporized silica in the tail flame to a controlled quench in the presence of hydrogen or a hydrogen-containing compound capable of disassociating to release free hydrogen in an amount and at a temperature to produce submicron thixotropic silica particles therefrom.

2. A process as claimed in claim 15 in which the hydrogen containing compound is introduced into the plasma system at a position arranged to ensure that the compound generates free hydrogen which is present during the formation of the solid submicron silica particles.

3. A process as claimed in claim 2 in which the hydrogen containing compound is introduced with the feed of silica particles.

4. A process as claimed in claim 2 in which the hydrogen containing compound is introduced with the quench gas.

5. A process as claimed in claim 3 in which the hydrogen containing compound is water.

6. A process as claimed in claim 4 in which the hydrogen containing compound is water.

References Cited

UNITED STATES PATENTS

| 2,616,842 | 11/1952 | Sheer et al. | 106—288I |
| 2,866,716 | 12/1958 | Broge | 106—288I |
| 2,973,282 | 2/1961 | Gross | 106—288I |

JAMES E. POER, Primary Examiner

U.S. Cl. X.R.

106—308, 309

UNITED STATES PATENT OFFICE
CERTIFICATE OF CORRECTION

PO-1050
(5/69)

Patent No. 3,558,337          Dated   January 26, 1971

Inventor(s) William Barnes and Donald Barby

It is certified that error appears in the above-identified patent and that said Letters Patent are hereby corrected as shown below:

In the heading to the printed specification, line 6, after "England" insert --,assignors to Joseph Crosfield and Sons, Limited, Warrington, Lancashire, England, a company of Great Britain--;

Column 3, line 29, "there" should be --three--;

Column 4, line 6, "eveluation" should be --evaluation--;

line 41, "thioxtropy" should be --thixotropy--;

Column 5, line 32, "3.15" should be --4.15--;

line 54, "electromicrograph" should be --electronmicrograph--;

Column 7, line 42, "electromicrographs" should be --electronmicrographs--;

line 44, "electromicrographs" should be --electronmicrographs--;

Column 8, line 45, "15" should be --1--.

Signed and sealed this 7th day of September 1971.

(SEAL)
Attest:

EDWARD M. FLETCHER, JR.
Attesting Officer

ROBERT GOTTSCHALK
Acting Commissioner of Paten